US010432661B2

(12) United States Patent
Vasseur et al.

(10) Patent No.: US 10,432,661 B2
(45) Date of Patent: Oct. 1, 2019

(54) SCORE BOOSTING STRATEGIES FOR CAPTURING DOMAIN-SPECIFIC BIASES IN ANOMALY DETECTION SYSTEMS

(71) Applicant: Cisco Technology, Inc., San Jose, CA (US)

(72) Inventors: Jean-Philippe Vasseur, Anchorage, AK (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 15/168,833

(22) Filed: May 31, 2016

(65) Prior Publication Data

US 2017/0279848 A1    Sep. 28, 2017

Related U.S. Application Data

(60) Provisional application No. 62/312,754, filed on Mar. 24, 2016.

(51) Int. Cl.
| | |
|---|---|
| *G06F 21/00* | (2013.01) |
| *H04L 29/06* | (2006.01) |
| *H04W 12/02* | (2009.01) |
| *H04L 29/08* | (2006.01) |
| *H04L 12/911* | (2013.01) |

(52) U.S. Cl.
CPC ...... *H04L 63/1458* (2013.01); *H04L 63/1425* (2013.01); *H04L 67/02* (2013.01); *H04L 69/16* (2013.01); *H04W 12/02* (2013.01); *H04L 47/825* (2013.01); *H04L 2463/142* (2013.01)

(58) Field of Classification Search
CPC ............. H04L 63/1425; H04L 63/1416; H04L 63/145; H04L 63/1433; H04L 63/1408
See application file for complete search history.

(56) References Cited

U.S. PATENT DOCUMENTS

| | | | |
|---|---|---|---|
| 9,143,522 B2 | 9/2015 | Wang et al. | |
| 9,319,421 B2 | 4/2016 | Ferragut et al. | |
| 9,680,866 B2 * | 6/2017 | Baddour | G06F 17/30864 |
| 2007/0079379 A1 * | 4/2007 | Sprosts | G06Q 10/107 |
| | | | 726/24 |
| 2008/0028470 A1 | 1/2008 | Remington et al. | |
| 2011/0295783 A1 | 12/2011 | Zhao et al. | |

(Continued)

OTHER PUBLICATIONS

Chandola et al. "Anomaly Detection : A Survey" A modified version of this technical report will appear in ACM Computing Surveys; Sep. 2009; pp. 1-72.

*Primary Examiner* — Ghazal B Shehni
(74) *Attorney, Agent, or Firm* — Behmke Innovation Group LLC; James Behmke; Stephen D. LeBarron

(57) ABSTRACT

In one embodiment, a device in a network detects an anomaly in the network using an anomaly detector. The anomaly corresponds to an anomalous behavior exhibited by one or more nodes in the network. The device computes an anomaly score for the anomaly that represents a measure of the anomalous behavior. The device adjusts the anomaly score using a boost score. The boost score is generated by a boosting function that accounts for domain-specific biases of the anomaly detector. The device reports the anomaly to a supervisory device based on whether the adjusted anomaly score exceeds a reporting threshold.

20 Claims, 10 Drawing Sheets

(56) References Cited

U.S. PATENT DOCUMENTS

2015/0304349 A1* 10/2015 Bernstein ............ H04L 63/1425
  726/22
2016/0028750 A1*  1/2016 Di Pietro ............ H04L 63/1458
  726/23

* cited by examiner

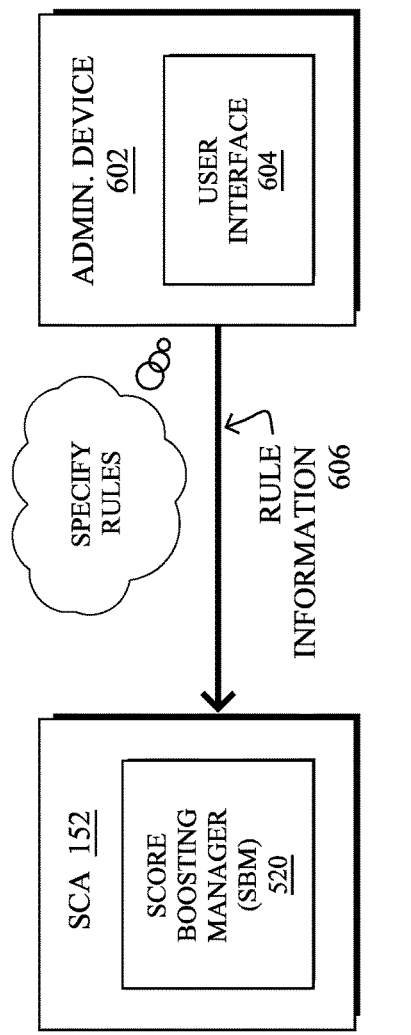
FIG. 6A
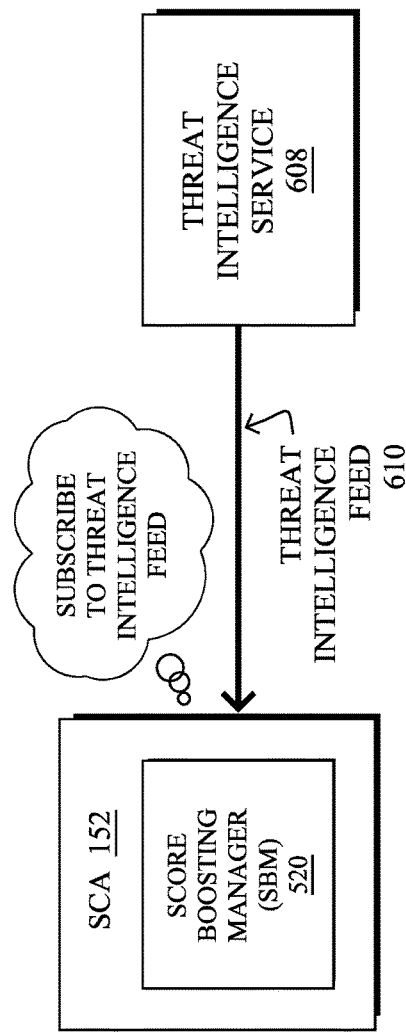
FIG. 6B
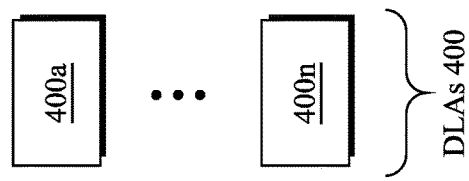
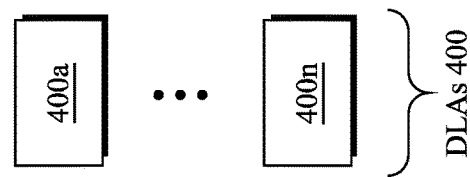

SCORE BOOSTING STRATEGIES FOR CAPTURING DOMAIN-SPECIFIC BIASES IN ANOMALY DETECTION SYSTEMS

RELATED APPLICATIONS

This application claims priority to U.S. Provisional Application No. 62/312,754, filed Mar. 24, 2016, entitled "SCORE BOOSTING STRATEGIES FOR CAPTURING DOMAIN-SPECIFIC BIASES IN ANOMALY DETECTION SYSTEMS," by Vasseur et al., the contents of which are hereby incorporated by reference.

TECHNICAL FIELD

The present disclosure relates generally to computer networks, and, more particularly, to score boosting strategies for capturing domain-specific biases in anomaly detection systems.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6D illustrate an example of the distribution of a boosting function in a network.

DESCRIPTION OF EXAMPLE EMBODIMENTS

Overview

Figure 1A:
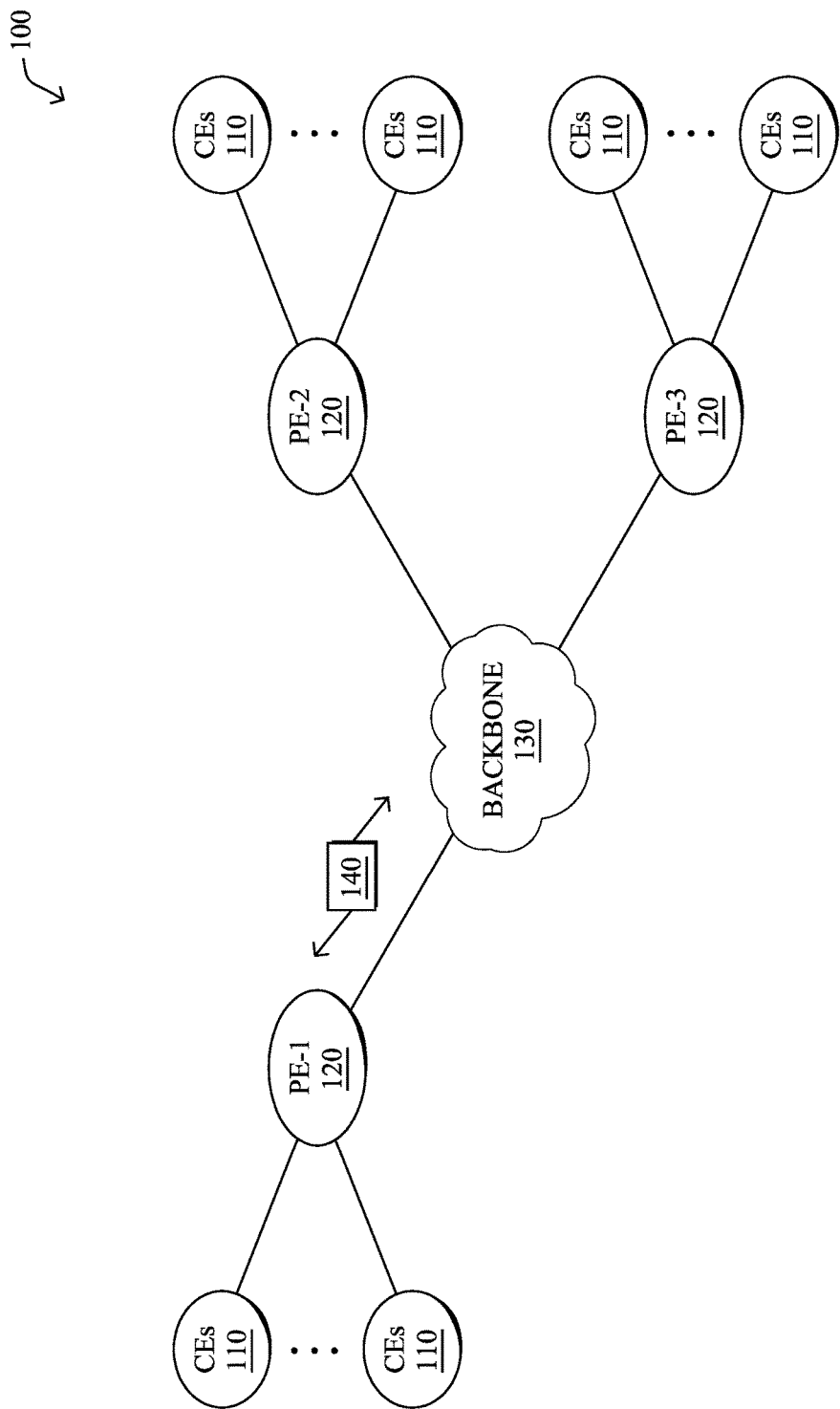
FIGS. 1A-1B illustrate an example communication network.

According to one or more embodiments of the disclosure, a device in a network detects an anomaly in the network using an anomaly detector. The anomaly corresponds to an anomalous behavior exhibited by one or more nodes in the network. The device computes an anomaly score for the anomaly that represents a measure of the anomalous behavior. The device adjusts the anomaly score using a boost score. The boost score is generated by a boosting function that accounts for domain-specific biases of the anomaly detector. The device reports the anomaly to a supervisory device based on whether the adjusted anomaly score exceeds a reporting threshold.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
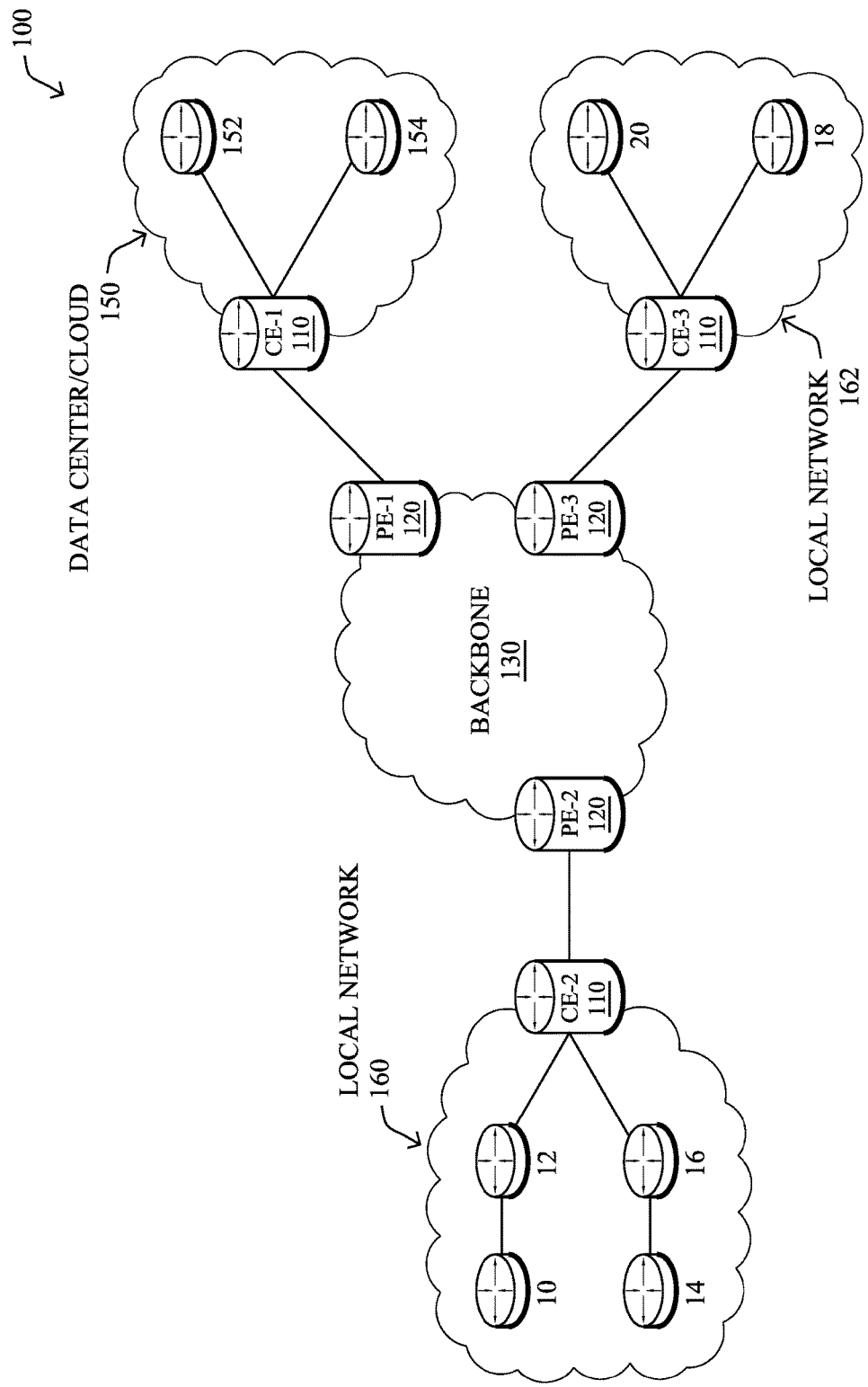

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
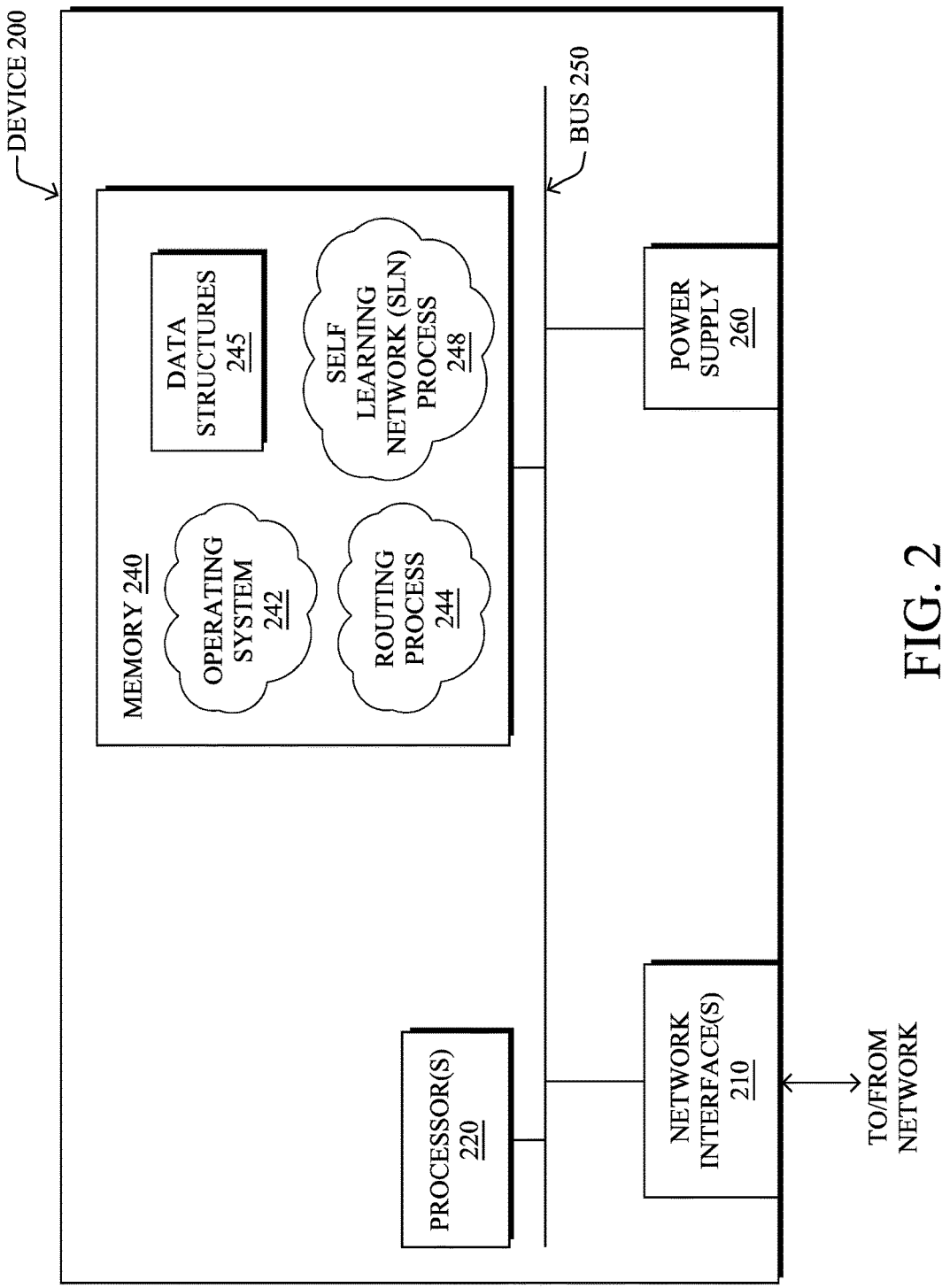
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D) DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
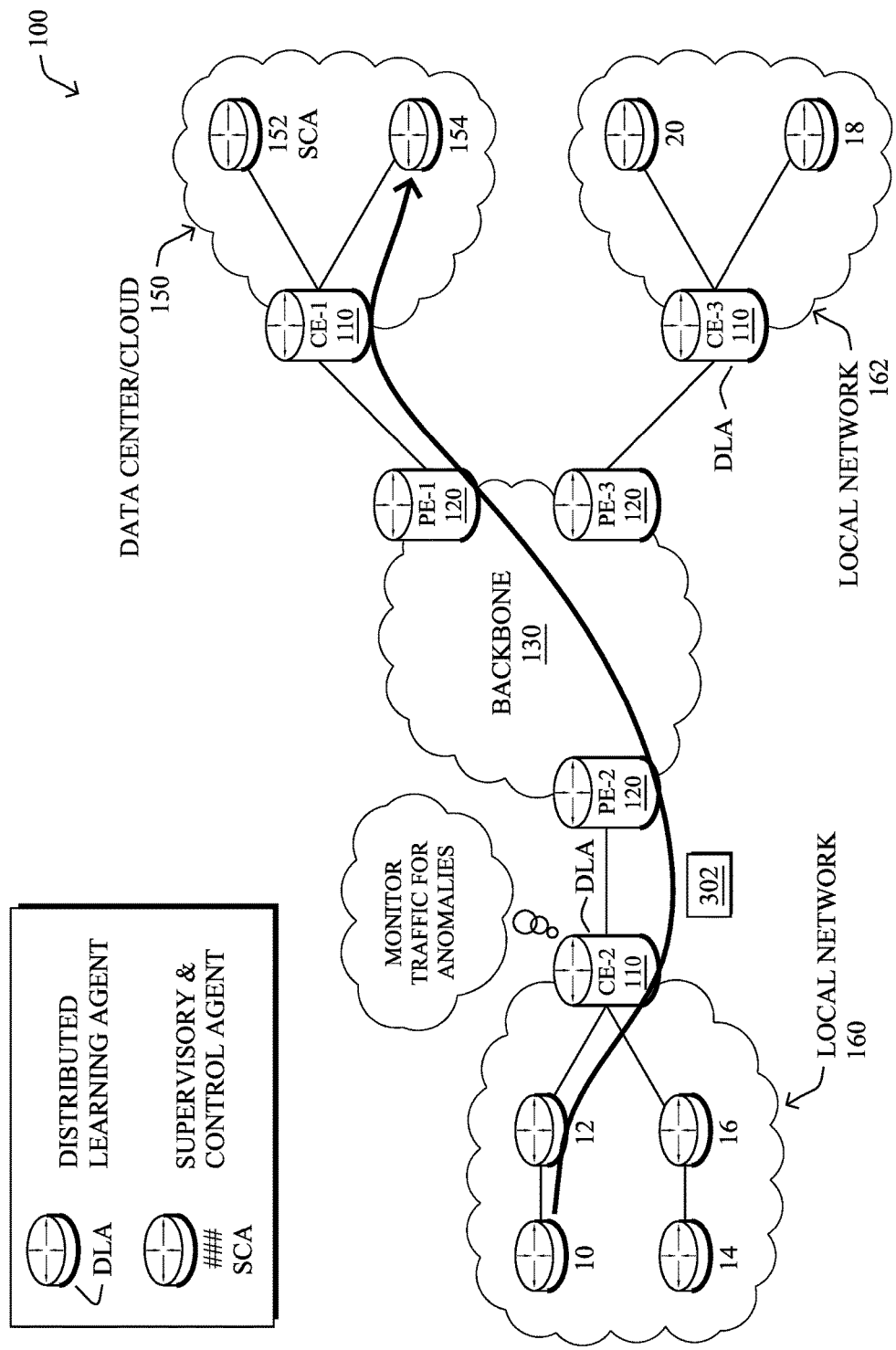
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
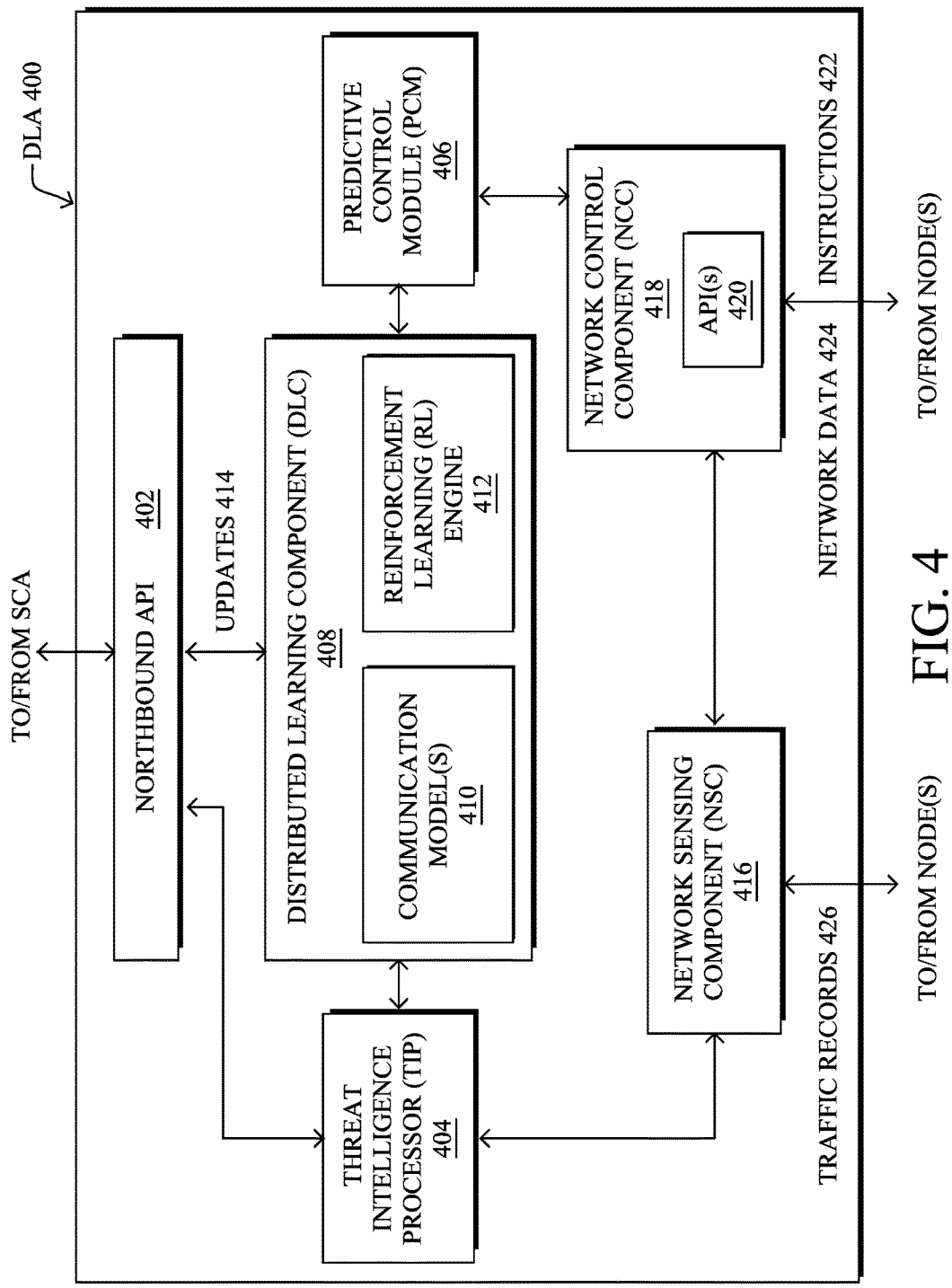
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, an anomaly detector process may rely on the notion of statistical likelihood to calculate an anomaly score that can be used, in turn, to determine whether a specific event is anomalous. In particular, an anomaly detector may operate by modeling a distribution f(X) of historical data, where X is a so-called feature vector in $R^n$ whose dimensions are the n features that quantify different network behaviors. Then, each new event i can be scored as the posterior probability $p=P(Xi|X_1, X_2, \ldots, X_{i-1})$. That is, an anomaly detector may look to the probability that the feature vector X, is observed in the network, given previous observations $X_1$ to $X_{i-1}$. For very low values of p, the anomaly detector may raise an anomaly and, typically, the higher the index i, the higher the "significance" of the anomaly. However, the notion of significance is often overlooked due to system limitations.

In one example, consider the case in which an anomaly detection system observes a 10 MB sized upload after seeing a plurality of 1 KB sized uploads. If the number of observed 1 KB uploads is large (e.g., one million) and the number of observed 10 MB sized uploads is small (e.g., ten), the system may consider the 10 MB upload as more anomalous. However, this does not indicate the actual significance of the event. For example, assume that the 1 KB uploads are DNS uploads from a group of hosts A. Suddenly, two distinct hosts in A perform a 10 MB and a 1 MB upload, respectively. From a purely statistical sense, both events are just as unlikely. However, from a networking standpoint, one is much more significant; that is, the extent of the data leak.

Some statistical models may capture the magnitude of a deviation quite easily. However, there are many more domain-specific biases that a real-life anomaly detection system must implement to yield relevant events. In particular, there are relationships between features and protocols that must be accounted for in the scoring process. Notably, a large deviation in the number of bytes may be quite benign for some protocols (e.g., HTTP), but may be extremely significant/critical for others (e.g., Syslog). Similarly, anomalies related to flow duration may be a major concern for some protocols and not for others (e.g., control plane with keep-alive).

Score Boosting Strategies for Capturing Domain-Specific Biases in Anomaly Detection Systems The techniques herein introduce a series of mechanisms that enable the enrichment of a distributed anomaly detection system by specifically boosting the score of anomalous events that match certain domain-specific criteria. In some aspects, these mechanisms allow for the propagation of input at the edge for third-party security appliances (e.g., via threat intelligence feeds), an end user (e.g., via a user interface), and/or domain experts (e.g., via the upload of pre-computed rules or statistical models).

Specifically, according to one or more embodiments of the disclosure as described in detail below, a device in a network detects an anomaly in the network using an anomaly detector. The anomaly corresponds to an anomalous behavior exhibited by one or more nodes in the network. The device computes an anomaly score for the anomaly that represents a measure of the anomalous behavior. The device adjusts the anomaly score using a boost score. The boost score is generated by a boosting function that accounts for domain-specific biases of the anomaly detector. The device reports the anomaly to a supervisory device based on whether the adjusted anomaly score exceeds a reporting threshold.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, FIGS. 5A-5D illustrate an example of a DLA applying a boost score to an anomaly score, according to various embodiments. One aspect of the techniques herein introduces a boosting function B( ) that a DLA may use to adjust an anomaly score.

Figure 5A:
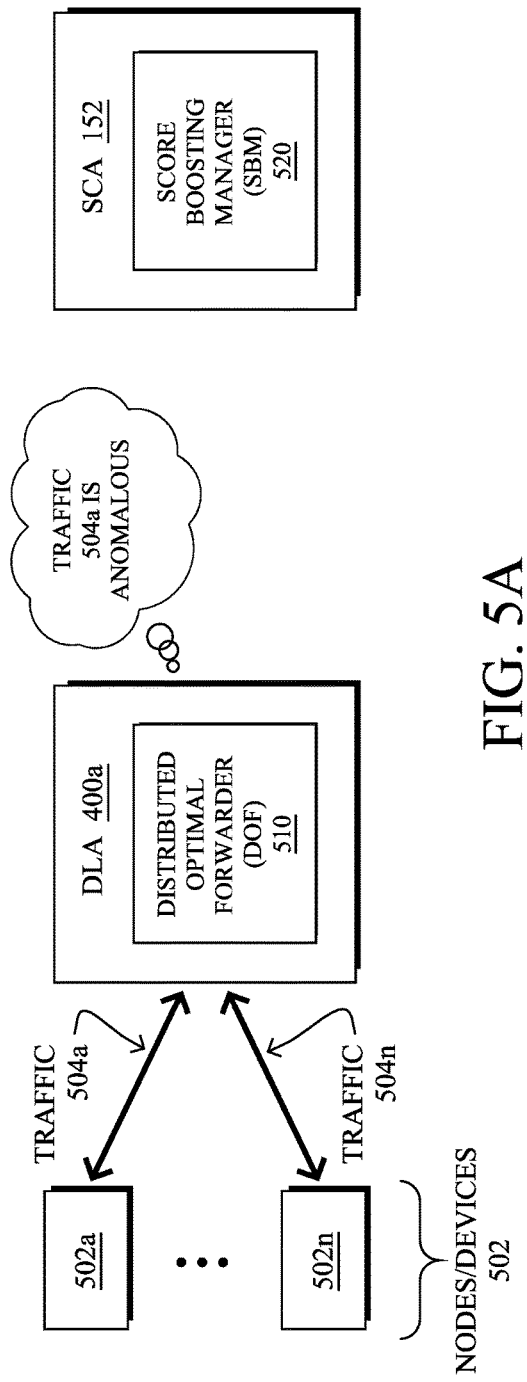
FIGS. 5A-5D illustrate an example of a DLA applying a boost score to an anomaly score.

As shown in FIG. 5A, a DLA 400a may execute a Distributed Optimal Forwarder (DOF) 510 in conjunction with the processes described above with respect to DLA 400. Generally, DOF 510 is configured to determine whether to notify a central controller (e.g., SCA 152) when DLA 400a detects an anomaly. Notably, DOF 510 may store and apply boosting function B( ) to the anomaly scores of anomalies detected by DLA 400a, to determine whether a particular anomaly is of great enough significance to report the anomaly to SCA 152. In various embodiments, DOF 510 may be a stand-alone process or implemented as a sub-process of another DLA module, such as DLC 408.

Assume, for purposes of illustration, that DLA 400a monitors the traffic flows from any number of nodes/devices 502 (e.g., a first through nth node/device) in the local domain or network of DLA 400a. As described above, DLA 400a may monitor the corresponding traffic flows 504 (e.g., a first through nth traffic flow) associated with host nodes/devices 502 to gather features for construction of a feature vector. Example features may include, but are not limited to, the times of traffic flows 504, the durations of traffic flows 504, the size of traffic flows 504, the source and/or destinations of traffic flows 504, the applications associated with traffic flows 504, the protocols associated with traffic flows 504, combinations thereof, or any other traffic information that may indicate a potential network anomaly. For example, assume that DLA 400a determines that traffic flow 504a from host node 502a is anomalous, based on the gathered characteristics of traffic flow 504a.

Figure 5B:
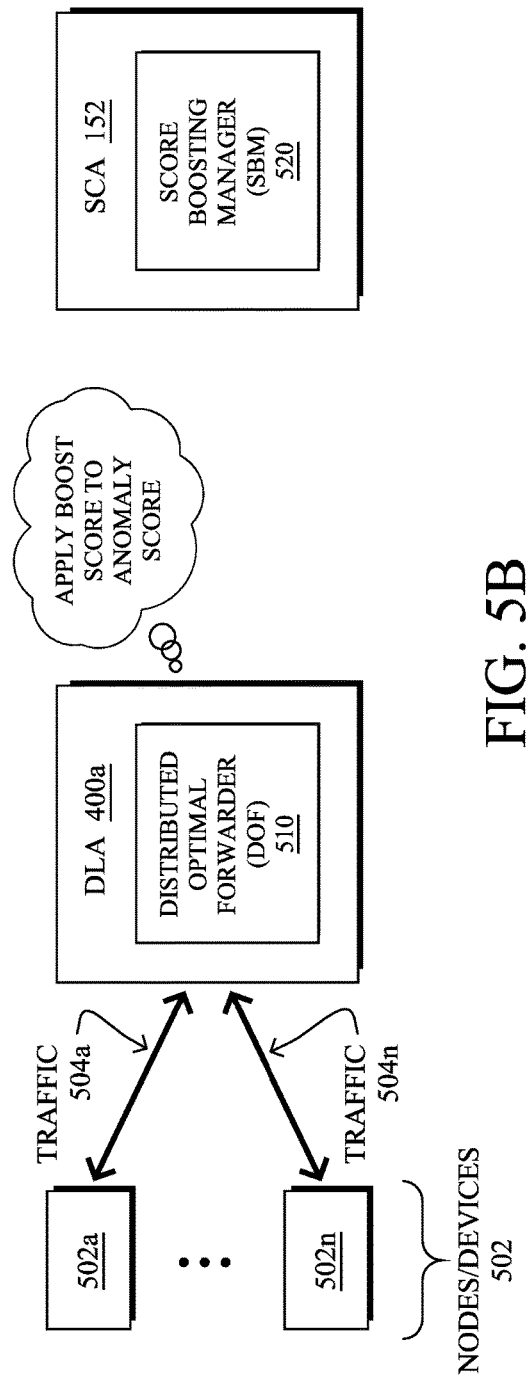
Figure 5C:
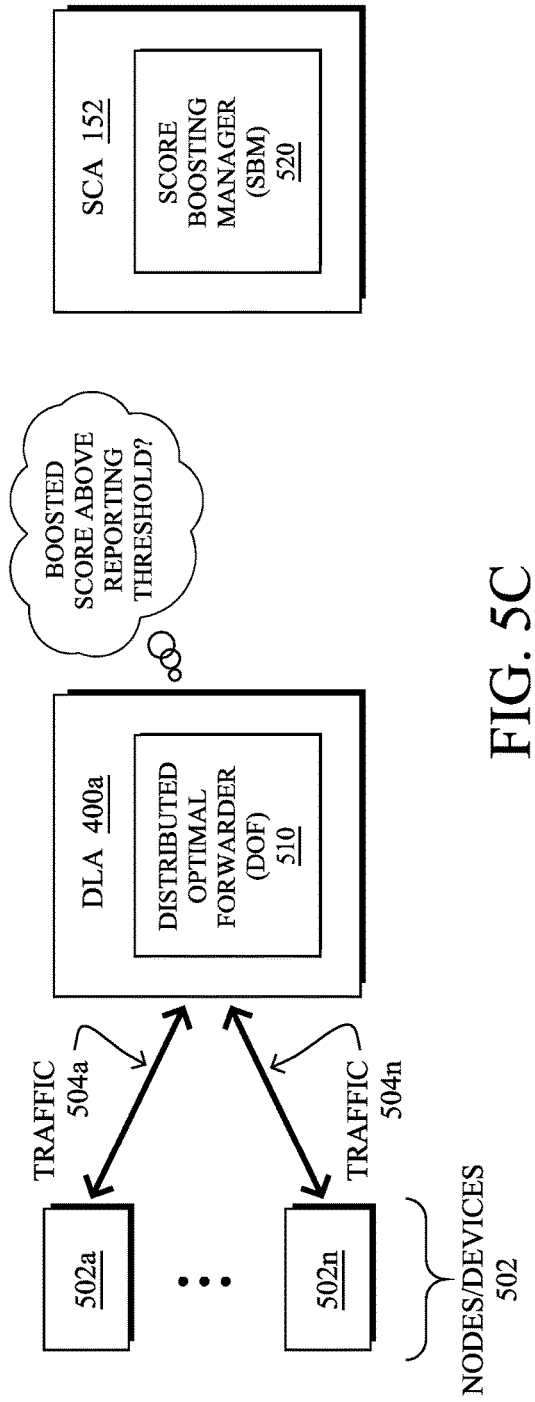

As shown in FIG. 5B, when DLA 400a detects an anomaly, DOF 510 may capture each anomaly and adjust/boost the corresponding anomaly score of the anomaly using boosting function B( ). In turn, DLA 400a may determine whether to report the anomaly based on the adjusted/boosted score exceeding a reporting threshold and/or other factors, as shown in FIG. 5C. For example, DLA 400a may take into account the scores of previous anomalies when determining the reporting threshold. In further embodiments, DOF 510 may employ a reporting "budget" to determine which anomalies to report to SCA 152 in a given timeframe. For example, DOF 510 may constrain the cumulative adjusted scores of the reported anomalies in a given time period, to further limit which anomalies are reported and conserve network resources. Of course, the higher the adjusted score, the higher the chances the anomaly is forwarded to the central controller. Also, reported anomaly scores are often mapped into severity classes (e.g. low, medium, high) on controllers and/or a Security Information and Event Management (SIEM) system, making the dynamic adjusting of anomaly scores of utmost importance to anomaly detection systems.

Figure 5D:
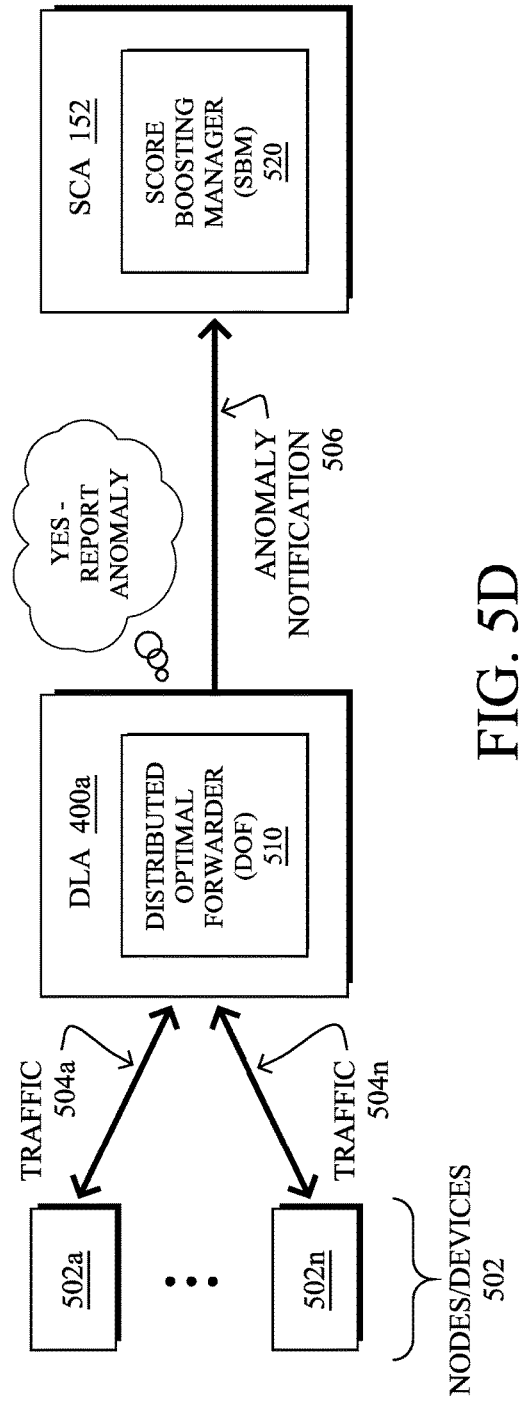

As shown in FIG. 5D, if DLA 400a determines that the anomaly score for the anomalous traffic flow 504a is such that reporting is required after adjustment using a boost score from the boosting function, DLA 400a may send an anomaly notification 506 to SCA 152. Notification 506 may include any or all of the information regarding the detected anomaly, in various embodiments. For example, notification 506 may simply identify that traffic flow 504a is anomalous or may include the full set of feature vector(s) that resulted in the raised anomaly.

The boosting function B( ) may take many forms, one of which is simply a set of rules that multiply the anomaly score by a given factor when they are matched. An example of the function B( ) is illustrated below:

```
function B(anomaly) {
    score = anomaly.score
    for (rule <- ruleset) {
        if (rule.match(anomaly)) {
            score = score * rule.factor
        }
    }
    return score
}
```

Such rules may address, for example, any domain-specific biases of the anomaly detector. In other words, while a particular traffic flow or other behavior may be anomalous in comparison to other traffic or behaviors in the domain, the traffic or other behavior may be of little significance from a global perspective. Example rules may include, but are not limited to, rules that pertain to the traffic size, traffic timing (e.g., start, end, or duration of a traffic flow), applications or protocols associated with the traffic, or the like.

In another embodiment, the system may learn the function B( ) from the feedback of experts. In this case, sample anomalies obtained from previous runs of the system are rated by a series of experts and the system uses a regression process (e.g., decision trees, neural networks, deep learning) to learn the relationship between the properties of the anomaly (e.g., the type of traffic, the type and magnitude of the deviation, the time of day, etc.) and the score that would be given by an expert user. In other words, the boosting function B( ) may use a machine learning process that is trained with feedback from a network administrator or other user.

In yet another embodiment, the system may learn the function B( ) from the aggregation of threat intelligence reports. In this case, the system may generate feature vectors that correspond to potential anomalies from the description of known attacks and/or trends and they are used to train classification processes, such as deep neural networks. These types of processes are well-suited to the aggregation of very heterogeneous and complex sources of data, as they are able to construct hierarchical representations of features. The resulting classifier can then be used to perform score boosting, based on the criticality of the pattern. For example, the function B( ) may take the form:

```
function B(anomaly) {
    fs = construct_features(anomaly)
    class = predict_class(fs)
    if (class is not "unknown") {
        return anomaly.score * class.factor
    }
}
```

In the above example, assume that each class of attack has a well-defined multiplicative factor, but this factor can be made a constant (e.g., 2.0). Other constants may be used in other embodiments. Such classifiers can be computed on the controller (e.g., SCA 152) and then downloaded to the edge of the network (e.g., to DLA 400a), using a custom message.

In further embodiments, DOF 510 may be in charge of further modifying the function B( ) according to local criteria. Notably, DOF 510 may further boost/adjust the anomaly score according to local historical data for the anomaly. For example, DLA 400a may maintain a local index for each host according to the number of anomalies they have been involved in for the past X hours or other time period. DLA 400a may then apply a multiplying factor to boost scores of anomalies according to the history for the host. In some embodiments, the factor may decrease with time based on a time function (e.g., a linear or exponentially decreasing time function).

In another embodiment, DOF 510 may use negative boosting, in which boosting function B( ) may reduce the anomaly score instead of increasing the score. This can be particularly useful for suppressing events that are known, yet legitimate, statistical deviations. In some cases, one might want to use negative boosting for known attack patterns that are easy to capture using conventional approaches (e.g., firewalls), so as to allow emergent, zero-day malware to be reported more easily, especially if they exhibit extremely subtle behavior from a statistical standpoint. In this case, SCA 152 may decide whether or not to use negative boosting in the various DLAs based on their location in the network, and whether the traffic they monitor is also under surveillance by conventional appliances.

Another aspect introduced herein is a Score Boosting Manager (SBM) 520, which may be located in the central controller, such as SCA 152. FIGS. 6A-6D illustrate an example of the distribution of a boosting function in a network, according to various embodiments.

Generally, SBM 520 is responsible for computing and pushing the boosting function B( ) to each DLA. For example, as shown in FIG. 6A, assume that SCA 152 oversees any number of DLAs 400 (e.g., a first through nth DLA). In such a case, SBM 520 on SCA 152 may aggregate information from any number of sources to construct boosting function B( ). For example, if B( ) takes the form of a set of rules, SBM 520 may offer an application program interface (API) and/or a Graphical User Interface (GUI) 604 to the user for editing those rules. Notably, a user operating an administrative device 602 or SCA 152 itself may manipulate GUI 604 to define the rules for the boosting function B( ). In turn, GUI 604 may send the defined rule information 606 to SBM 520 for processing.

When the function B( ) is learned, SBM 520 may be responsible for collecting training data, performing the training of the model as well as its cross-validation, and then, if satisfactory, pushing the result to any or all of DLAs 400a-400n.

In one embodiment, SBM 520 may subscribe to threat intelligence feeds and construct a training set from the obtained Indicators of Compromise (IOCs), as shown in FIG. 6B. Generally, threat intelligence feeds are feeds from a threat intelligence service that provide information regarding known threats (e.g., potentially malicious addresses, attack patterns, etc.). For example, threat intelligence service 608 may provide threat intelligence feed 610 to SBM 520, as illustrated in FIG. 6B. An example function for training a boosting function using an IOC is illustrated below:

```
classifier = deep_neural_net( )
training_set = get_initial_dataset( )
for (feed <- sources) {
    for (ioc <- feed) {
        x = construct_features(ioc)
        add (x, ioc.attack_type) to training_set
    }
}
classifier.train(training_set)
```

Note that the function get_initial_dataset( ) may return a training set composed of "unknown" examples, that is, feature vectors of anomalies that do not correspond to any clear attack pattern.

Figure 6C:
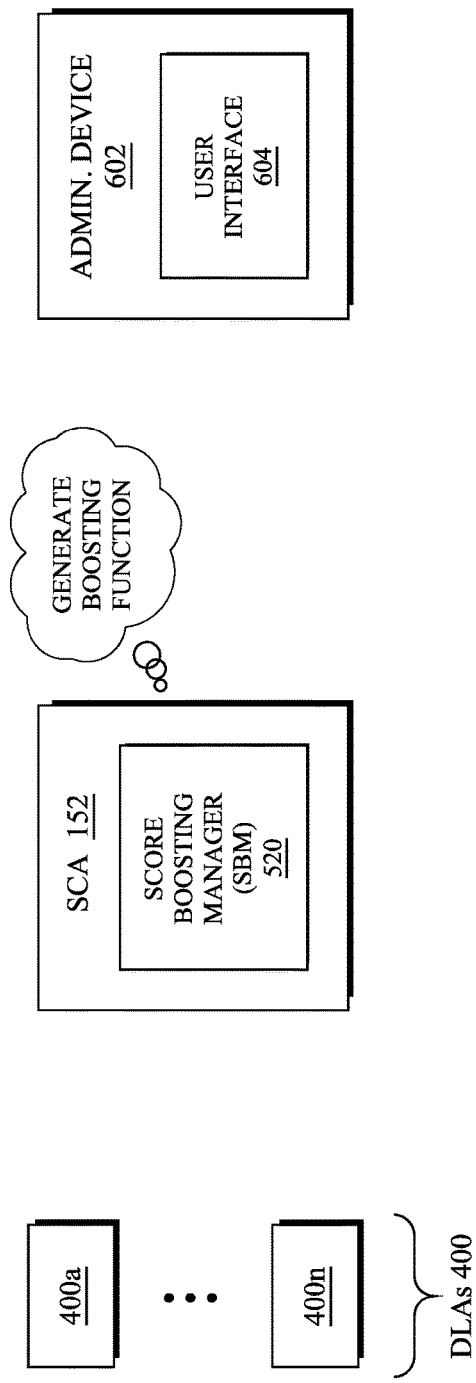

As shown in FIG. 6C, SBM 520 may generate the boost function B( ) using any or all of the techniques described herein. For example, SBM 520 may use rules provided via a GUI and/or IOCs from a threat intelligence feed, to generate the boost function. In further embodiments, SBM 520 may train the boosting function using feedback from the GUI regarding the significance of reported anomalies. In turn, SBM 520 may train a machine learning model to predict whether a new set of feature vectors would also be labeled as significant to the user.

Figure 6D:
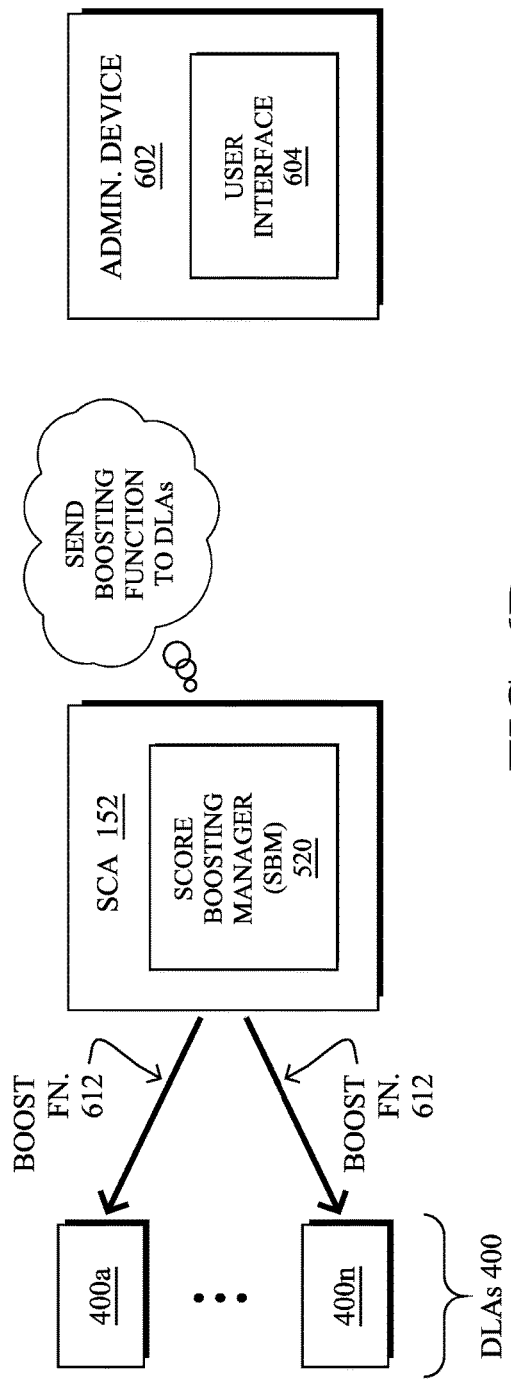

In FIG. 6D, SBM 520 may distribute the generated boosting function 612 to any or all of DLAs 400*a*-400*n*. In turn, the receiving DLA may use the boosting function to calculate boost scores for any anomalies detected by the DLA, to control its anomaly reporting to SCA 152.

Figure 7:
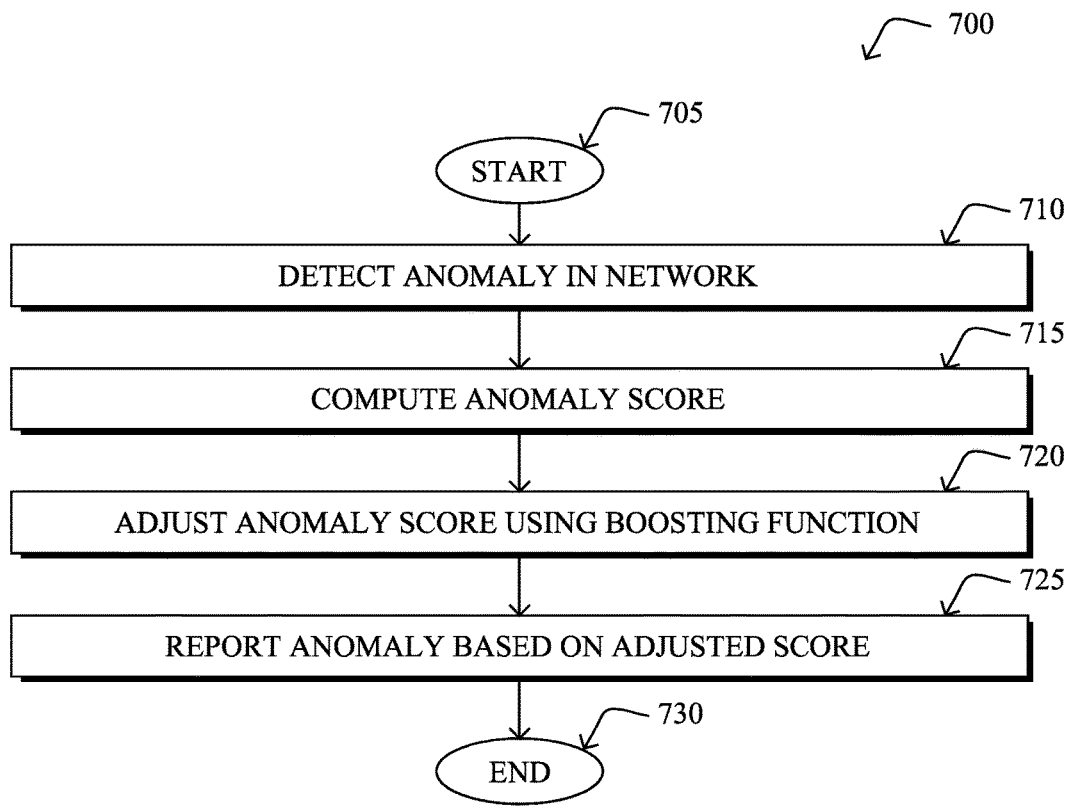
FIG. 7 illustrates an example simplified procedure for employing a score boosting strategy to capture domain-specific biases in an anomaly detection system.

FIG. 7 illustrates an example simplified procedure for employing a score boosting strategy to capture domain-specific biases in an anomaly detection system, in accordance with embodiments herein. Procedure 700 may be performed, for example, by a device in a network executing stored instructions (e.g., SLN process 248, etc.). For example, a DLA at the edge of a local domain or network may perform procedure 700 as part of its anomaly detection functions. Procedure 700 starts at step 705 and continues on to step 710 where, as described in greater detail above, the device detects an anomaly in the network. For example, the device may execute one or more machine learning or statistics-based anomaly detectors to analyze network traffic or other network behaviors/characteristics and identify when an anomaly exists.

At step 715, as detailed above, the device may compute an anomaly score for the detected anomaly. Generally, the anomaly score may represent the degree of the anomalous behavior. For example, if the anomaly detector uses statistics to detect anomalies, the anomaly score may be based on the computed probability of the device observing a set of features (e.g., network characteristics/behaviors), in view of previously observed features. In other words, the anomaly score may represent how anomalous the behavior is in comparison to the previous behaviors of the network.

At step 720, the device may adjust the anomaly score using a boost score, as described in greater detail above. In various embodiments, the boost score is generated by a boosting function that accounts for domain-specific biases of the anomaly detector. For example, the boosting function may comprise a set of rules that relate to the type, application, and/or protocol of a traffic flow, timing information for the traffic flow (e.g., start, end, and/or duration), or other information that may control the resulting boost score for a detected anomaly. In another embodiment, the boosting function may comprise a machine learning classifier that was trained using training data from one or more threat intelligence feeds. In a further embodiment, the boosting function may be a machine learning process trained using feedback from a user interface regarding the significance of other reported anomalies (e.g., a regression-based process, etc.). In various cases, the device may adjust the anomaly score by multiplying, adding, etc. the boost score to it. In some cases, the boost score, when applied, may even lower the anomaly score.

At step 725, as detailed above, the device may report the detected anomaly to a supervisory device (e.g., an SCA, etc.), based on whether the adjusted anomaly score exceeds a reporting threshold. For example, if the anomaly score itself is very high due and the boost score is very low, this may prevent the device from reporting the anomaly despite the originally high anomaly score. Conversely, the device may report an anomaly with a low anomaly score but a very high boost score, since the mildly anomalous behavior is of high significance (e.g., the anomaly relates to a particular protocol or application of interest, etc.). In some embodiments, the device may further base the reporting on prior anomalies (e.g., using an index of previously detected anomalies), a reporting budget, or other mechanisms to control anomaly reporting. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow an anomaly detection system to alleviate critical problems associated with anomalous events that are statistically "surprising," but are not "relevant" from a security standpoint. In some aspects the techniques herein allow for the suppression of these events to the benefit of other relevant events. Notably, certain aspects of the techniques use a domain specific boosting function to modify the score of a detected anomaly. In addition, the techniques use supervised learning to extract domain specific knowledge.

While there have been shown and described illustrative embodiments for capturing domain-specific biases in anomaly detection systems, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    detecting, by a device in a network, an anomaly in the network using an anomaly detector, wherein the anomaly corresponds to an anomalous behavior exhibited by one or more nodes in the network;
    computing, by the device, an anomaly score for the anomaly that represents a measure of the anomalous behavior;
    once the anomaly score has been computed, adjusting, by the device, the anomaly score using a boost score, wherein the boost score is generated by a boosting function that accounts for domain-specific biases of the anomaly detector and multiplies the anomaly score by a factor based the domain specific biases of the anomaly detector; and
    reporting, by the device, the anomaly to a supervisory device based on whether the adjusted anomaly score exceeds a reporting threshold.

2. The method as in claim 1, wherein the boosting function comprises a machine learning classifier that was trained using training data from one or more threat intelligence feeds.

3. The method as in claim 1, wherein the boosting function comprises a set of rules, wherein at least one of the rules specifies an application type and the application type matches that of traffic associated with the detected anomaly.

4. The method as in claim 1, wherein the boosting function comprises a set of rules, wherein at least one of the rules specifies a network protocol and the network protocol matches that of traffic associated with the detected anomaly.

5. The method as in claim 1, wherein the boosting function comprises a regression-based machine learning process trained using feedback from a user interface.

6. The method as in claim 1, further comprising:
receiving, at the device, the boosting function from the supervisory device.

7. The method as in claim 1, wherein the boost score decreases the anomaly score.

8. The method as in claim 1, further comprising:
maintaining, by the device, an index of anomalies detected by the device within a given timeframe, wherein the boost score is based in part on a quantity of anomalies in the index of anomalies.

9. An apparatus, comprising:
one or more network interfaces to communicate with a network;
a processor coupled to the one or more network interfaces and configured to execute one or more processes; and
a memory configured to store a process executable by the processor, the process when executed operable to:
detect an anomaly in the network using an anomaly detector, wherein the anomaly corresponds to an anomalous behavior exhibited by one or more nodes in the network;
compute an anomaly score for the anomaly that represents a measure of the anomalous behavior;
once the anomaly score has been computed, adjust the anomaly score using a boost score, wherein the boost score is generated by a boosting function that accounts for domain-specific biases of the anomaly detector and multiplies the anomaly score by a factor based the domain specific biases of the anomaly detector; and
report the anomaly to a supervisory device based on whether the adjusted anomaly score exceeds a reporting threshold.

10. The apparatus as in claim 9, wherein the boosting function comprises a set of rules, wherein at least one of the rules specifies a network protocol and the network protocol matches that of traffic associated with the detected anomaly.

11. The apparatus as in claim 9, wherein the boosting function comprises a regression-based machine learning process trained using feedback from a user interface.

12. The apparatus as in claim 9, wherein the process when executed is further operable to:
receive the boosting function from the supervisory device.

13. The apparatus as in claim 9, wherein the boost score decreases the anomaly score.

14. The apparatus as in claim 9, wherein the process when executed is further operable to:
maintain an index of anomalies detected by the device within a given timeframe, wherein the boost score is based in part on a quantity of anomalies in the index of anomalies.

15. The apparatus as in claim 14, wherein the process when executed is further operable to:
decrease the boost score using a linear or exponential time function.

16. The apparatus as in claim 9, wherein the boosting function comprises a machine learning classifier that was trained using training data from one or more threat intelligence feeds.

17. A tangible, non-transitory, computer-readable media having software encoded thereon, the software when executed by a device in a network configured to:
detect an anomaly in the network using an anomaly detector, wherein the anomaly corresponds to an anomalous behavior exhibited by one or more nodes in the network;
compute an anomaly score for the anomaly that represents a measure of the anomalous behavior;
once the anomaly score has been computed, adjust the anomaly score using a boost score, wherein the boost score is generated by a boosting function that accounts for domain-specific biases of the anomaly detector and multiplies the anomaly score by a factor based the domain specific biases of the anomaly detector; and
report the anomaly to a supervisory device based on whether the adjusted anomaly score exceeds a reporting threshold.

18. The tangible, non-transitory, computer-readable media as in claim 17, wherein the boosting function comprises a machine learning classifier that was trained using training data from one or more threat intelligence feeds.

19. The tangible, non-transitory, computer-readable media as in claim 17, wherein the boosting function comprises a set of rules, wherein at least one of the rules specifies an application type or a network protocol and the application type or the network protocol matches that of traffic associated with the detected anomaly.

20. The tangible, non-transitory, computer-readable media as in claim 17, wherein the boosting function comprises a regression-based machine learning process trained using feedback from a user interface.

* * * * *

UNITED STATES PATENT AND TRADEMARK OFFICE
CERTIFICATE OF CORRECTION

PATENT NO. : 10,432,661 B2
APPLICATION NO. : 15/168833
DATED : October 1, 2019
INVENTOR(S) : Vasseur et al.

Page 1 of 1

It is certified that error appears in the above-identified patent and that said Letters Patent is hereby corrected as shown below:

In the Specification

Column 12, Line 59, please amend as shown:
vector $X_i$ is observed in the network, given previous obser- Signed and Sealed this
Fourth Day of February, 2020

Andrei Iancu
*Director of the United States Patent and Trademark Office*